(12) United States Patent
Sill

(10) Patent No.: US 6,450,564 B1
(45) Date of Patent: Sep. 17, 2002

(54) WALL JOINT CONFIGURATION

(75) Inventor: Gerald Allen Sill, Edgerton, WI (US)

(73) Assignee: Stoughton Trailers, Inc., Stoughton, WI (US)

( * ) Notice: Subject to any disclaimer, the term of this patent is extended or adjusted under 35 U.S.C. 154(b) by 0 days.

(21) Appl. No.: 09/633,652

(22) Filed: Aug. 7, 2000

(51) Int. Cl.⁷ ............................................. B62D 25/02
(52) U.S. Cl. ....................... 296/181; 296/29; 296/191; 52/584.1
(58) Field of Search ......................... 296/29, 181, 191; 52/582.1, 584.1, 578

(56) References Cited

U.S. PATENT DOCUMENTS

| | | |
|---|---|---|
| 3,386,218 A | 6/1968 | Scott |
| 4,045,927 A | 9/1977 | Diaz |
| 4,065,168 A | 12/1977 | Gregg |
| 4,104,840 A | 8/1978 | Heintz et al. |
| 4,656,809 A | 4/1987 | Wilson |
| 4,685,721 A | 8/1987 | Banerjea |
| 4,703,948 A | 11/1987 | Ehrlich |
| 4,810,027 A | 3/1989 | Ehrlich |
| 4,904,017 A | 2/1990 | Enrlich |
| 4,940,279 A | 7/1990 | Abott et al. |
| 4,958,472 A | 9/1990 | Ehrlich |
| 5,058,756 A | 10/1991 | Green |
| 5,066,066 A | 11/1991 | Yurgevich et al. |
| 5,112,099 A | 5/1992 | Yurgevich et al. |
| 5,195,800 A | 3/1993 | Stafford et al. |
| 5,286,079 A | 2/1994 | Zubko et al. |
| 5,433,501 A | 7/1995 | Thomas et al. |
| 5,439,266 A | 8/1995 | Ehrlich |
| 5,507,405 A | 4/1996 | Thomas et al. |
| 5,509,714 A | 4/1996 | Schmidt |
| 5,562,981 A | 10/1996 | Ehrlich |
| 5,700,118 A | 12/1997 | Bennett et al. |
| 5,704,676 A | 1/1998 | Hill |
| 5,772,276 A | 6/1998 | Fetz et al. |
| D398,264 S | 9/1998 | Fetz et al. |
| 5,860,693 A | 1/1999 | Ehrlich |
| 5,876,089 A | 3/1999 | Ehrlich |
| 5,938,274 A | 8/1999 | Ehrlich |
| 5,992,117 A | 11/1999 | Schmidt |
| 5,997,076 A | 12/1999 | Ehrlich |
| 6,003,932 A | 12/1999 | Banerjea et al. |
| 6,220,651 B1 * | 4/2001 | Ehrlich ........................ 296/181 |

* cited by examiner

Primary Examiner—Stephen T. Gordon
Assistant Examiner—Jason Morrow
(74) Attorney, Agent, or Firm—Michael Best & Friedrich LLP

(57) ABSTRACT

The wall joint of the present invention is configured to reduce or eliminate protrusions into the interior of the trailer or container, but does not require coining or stamping of the edges of consecutive sidewall panels. In some embodiments of the present invention, the wall joint includes two consecutive sidewall panels, each bent to form a main plateau, a spliced plateau and a jogged portion therebetween. In this way, the spliced plateau lies in a plane substantially parallel to and spaced from the main plateau, with the thickness of the sidewall panel most preferably remaining substantially constant throughout. Also, a recessed region is preferably defined at the seam between the two panels. A splicer plate connecting the adjacent panels can be received into this recessed region. In some preferred embodiments, adhesive and/or rivets are employed to further strengthen the sidewall panel joints.

30 Claims, 2 Drawing Sheets

WALL JOINT CONFIGURATION

FIELD OF THE INVENTION

This invention relates generally to devices and configurations for joining panels, and more particularly to devices and configurations for joining consecutive sidewall panels of a trailer or container.

BACKGROUND OF THE INVENTION

Freight is typically carried on highways in either trailers or containers. The primary distinction between the two is that trailers have wheels and are pulled behind tractors, while containers are simply "boxes," similar in appearance to the "box portions" of trailers, which are carried on chassis pulled behind tractors. In either case, the sidewalls are usually constructed by coupling, side-by-side, a plurality of vertical sidewall panels. As used herein and in the appended claims, the term "cargo body" refers to the sidewalls of a trailer, cargo container, truck body, or other cargo carrying body. Also, the term "sidewall" is not limited to the longitudinal walls of a trailer or cargo container, and include any walls (front walls, rear wall, walls connecting the front and rear walls, etc.) of a trailer or cargo container.

The most conventional sidewall construction is commonly referred to as "sheet and post" construction. In this type of construction, adjacent vertical edges of two consecutive, relatively thin, panels are overlapped and riveted together to form a joint. Additionally, a vertical reinforcing rib is riveted at the seam between the two panels. In this type of construction, because the panels are made of a relatively thin "skin" material, the vertical reinforcing ribs, or "posts," are needed for stiffness and strength.

A second, less common, but still conventional sidewall construction is referred to as "plate wall" construction. In plate wall construction, the panels are made of a thicker material than is used in sheet and post construction. The thicker panels provide enough stiffness and strength, themselves, that stiffening ribs or "posts" are not needed. The panels in plate wall construction are coupled in several different ways. Most commonly, two consecutive panels are butted up against each other and a plate or "splicer" is riveted to the consecutive panels to act as a bridge coupling them together.

Alternatively, the edges of consecutive panels may be overlapped and then riveted in a fashion similar to the way the panels are overlapped in sheet and post construction. In either case, the vertical edge of one or both consecutive sidewall panels is sometimes "coined" or stamped before being riveted to the adjacent panel. In some prior joint configurations, the coined edge of one sidewall panel overlaps the stamped or unstamped vertical edge of an adjacent sidewall panel and rivets are placed through the resulting, overlapping portion of the panels to secure them together. In other joint configurations, the edges of abutting, but not overlapping, consecutive panels are coined. Then, the coined portions of the consecutive panels are riveted to a splicer plate, which bridges between, and thereby connects, the panels.

In many prior joint configurations, coining is utilized to decrease protrusions into the interior of the trailer or container. Protrusions into the interior of the trailer or container may cause cargo to "catch" or "hang up" as it is being loaded and unloaded. Therefore, it is desirable for a trailer or container to have a smooth interior wall, free of protrusions. Rivets protruding into the interior of the trailer, splicer plates on the interior of the trailer over the seam between two panels, and uneven interior surfaces created by overlapping panels all create hindrances to the loading and unloading of cargo from the interior of the trailer. Additionally, these hindrances take up valuable space within the trailer which could otherwise be used for additional cargo.

These hindrances may be reduced or eliminated by coining the edges of the sidewall panels. Coining the edges of sidewall panels thins out the panels, creating recesses at the joints between panels, which, to varying degrees, couch protruding rivets, splicer plates, and overlapping panels. In this way, the interior surface of a trailer may be "evened out" or "smoothed out," lessening or eliminating protrusions into the interior of the trailer.

Therefore, many prior joint configurations call for coining at least one vertical edge of the sidewall panels. However, coining the edges of the sidewall panels raises certain issues. Sidewall panels are typically of a composite construction or are constructed of aluminum. Composite sidewall panels include a plastic core material sandwiched between an inner and outer thin, metal skin, while aluminum panels are usually solid aluminum. In the case of composite panels, coining the edges necessarily either reduces the amount of core material at the edges, or severely compresses it. Many prior art joint configurations severely compromise the structure of composite sidewalls by coining their edges. In the case of aluminum sidewall panels, coining the panel edges creates additional problems. The solid nature of aluminum panels makes them difficult to coin and, once coined, the stress on the aluminum can compromise its integrity. Some prior configurations have attempted to reduce the existence of protrusions into the trailer interior without coining the panels. However, these configurations suffer from other pitfalls, including being overly complex, being costly, and, again, compromising the integrity of the panels.

In light of the limitations of the prior art described above, a need exists for an alternative, strong, adequately sealed, easily assembled joint configuration (and method of manufacturing such a joint) which reduces or eliminates the existence of hindering protrusions into the interior of the trailer or container, but which does not require the coining or stamping of the edges of the trailer sidewall panels.

SUMMARY OF THE INVENTION

The unique wall joint of the present invention is configured to reduce or eliminate protrusions into the interior of the trailer or container, but does not require the coining or stamping of the edges of consecutive sidewall panels. According to some highly preferred embodiments of the present invention, the wall joint includes two consecutive sidewall panels, each bent to form a main plateau, a spliced plateau and a jogged portion between the main plateau and the spliced plateau. The jogged portion of the sidewall panel serves as a transition between the main plateau and the spliced plateau. In this way, the spliced plateau lies in a plane substantially parallel to, but spaced apart from, the main plateau. But, the thickness of the sidewall panel most preferably remains substantially constant throughout. When two consecutive sidewall panels are positioned next to each other, the spliced plateaus of the two consecutive sidewall panels abut each other and lie in a first plane, while the main plateaus of the two panels preferably lie in a second, parallel plane spaced apart from the first plane. Thus, a region recessed from the main plateaus and surrounding the seam between the two panels is created. The main plateaus preferably comprise the bulk of the interior, generally smooth-walled, surface of the cargo body, interrupted only by periodic recessed regions created by the spliced plateaus at the seams between the sidewall panels. It should be noted that while it is preferable for the main plateaus to lie in a single plane to create a generally flat interior cargo body wall, it is not necessary. The main plateaus may lie at slightly different levels, with the spliced plateaus still forming a recessed region there between.

In accordance with one highly preferred embodiment, with sidewall panels positioned next to each other, splicer plates preferably having adhesive on one side are then placed on either side of the abutting spliced plateaus, thereby sandwiching the recessed region between the splicer plates. In this way, the adhesive strips between the splicer plates and the sidewall panels serve to glue the splicer plates to the spliced plateaus of the sidewall panels creating a multiple layer joint connecting the two consecutive sidewall panels. The joint can then be further strengthened by placing a plurality of conventional fasteners, such as rivets (preferably at least one row on each side of the seam between the consecutive sidewall panels), through the entire multiple-layer joint. This unique joint configuration provides a simple, strong joint connecting consecutive sidewall panels. Moreover, this joint configuration serves to recess the splicer plates, adhesive layers, and rivets into the cargo body sidewall, thereby reducing or eliminating protrusions into the interior of the trailer or container.

Further objects and advantages of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
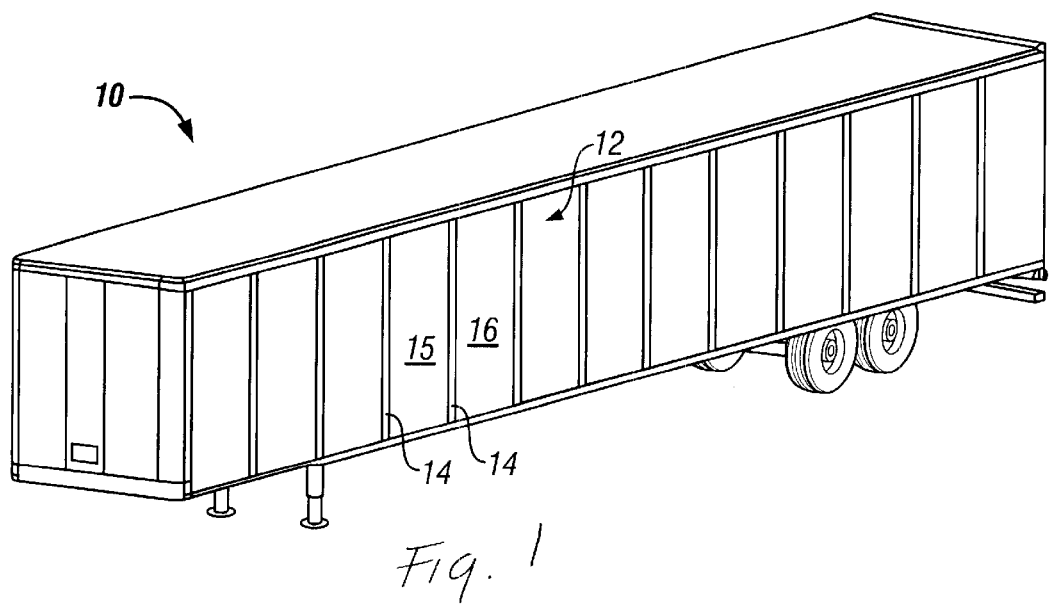
FIG. 1 is a perspective view of a trailer having wall joints, in accordance with the present invention, interconnecting a plurality of sidewall panels to create a sidewall.

With reference to FIG. 1, sidewall joints of the present invention, indicated generally at 14, serve to couple consecutive sidewall panels 15, 16 to form a sidewall 12 of a trailer 10, container, truck body, or other cargo carrying body. Although the preferred embodiments of the present invention described below and illustrated in the figures are presented with reference to a trailer 10, it should be noted that the present invention can be employed in a cargo container or any other box-type structure used to carry freight, whether permanently or removably secured with respect to a vehicle and whether having dedicated wheels or not. Sidewall panels 15, 16 preferably are formed of solid aluminum or constructed of a composite material having a plastic or epoxy core sheathed in a metal skin, but may be constructed of any of a number of other materials suitable for trailer sidewall panels, such as laminate panels, hollow-core panels, panels having a core filled with any desired material, panels made from steel or other metal, plastic, fiberglass, and the like.

Figure 2:
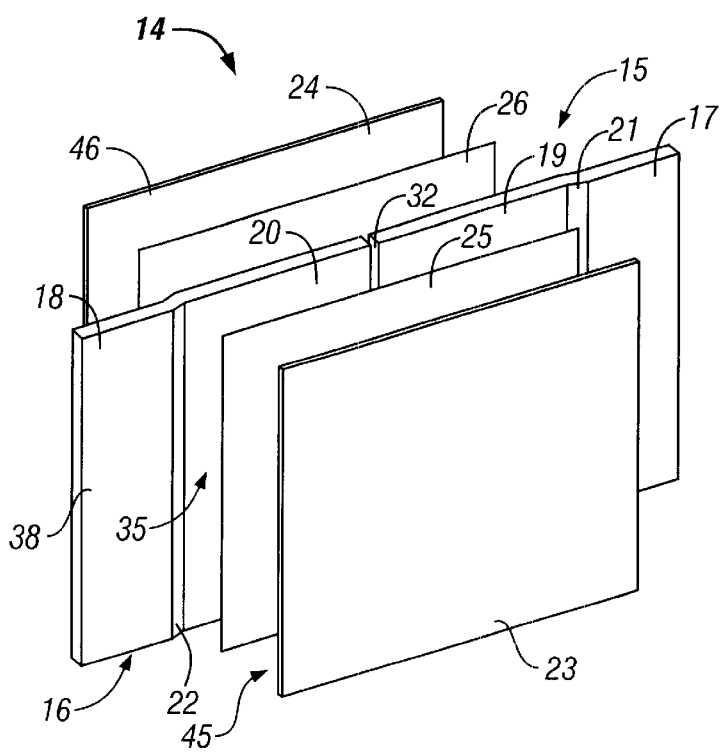
FIG. 2 is a an exploded perspective view of a joint of FIG. 1 showing portions of two consecutive sidewall panels sandwiched between two sheets of adhesive and two splicer plates.
Figure 3:
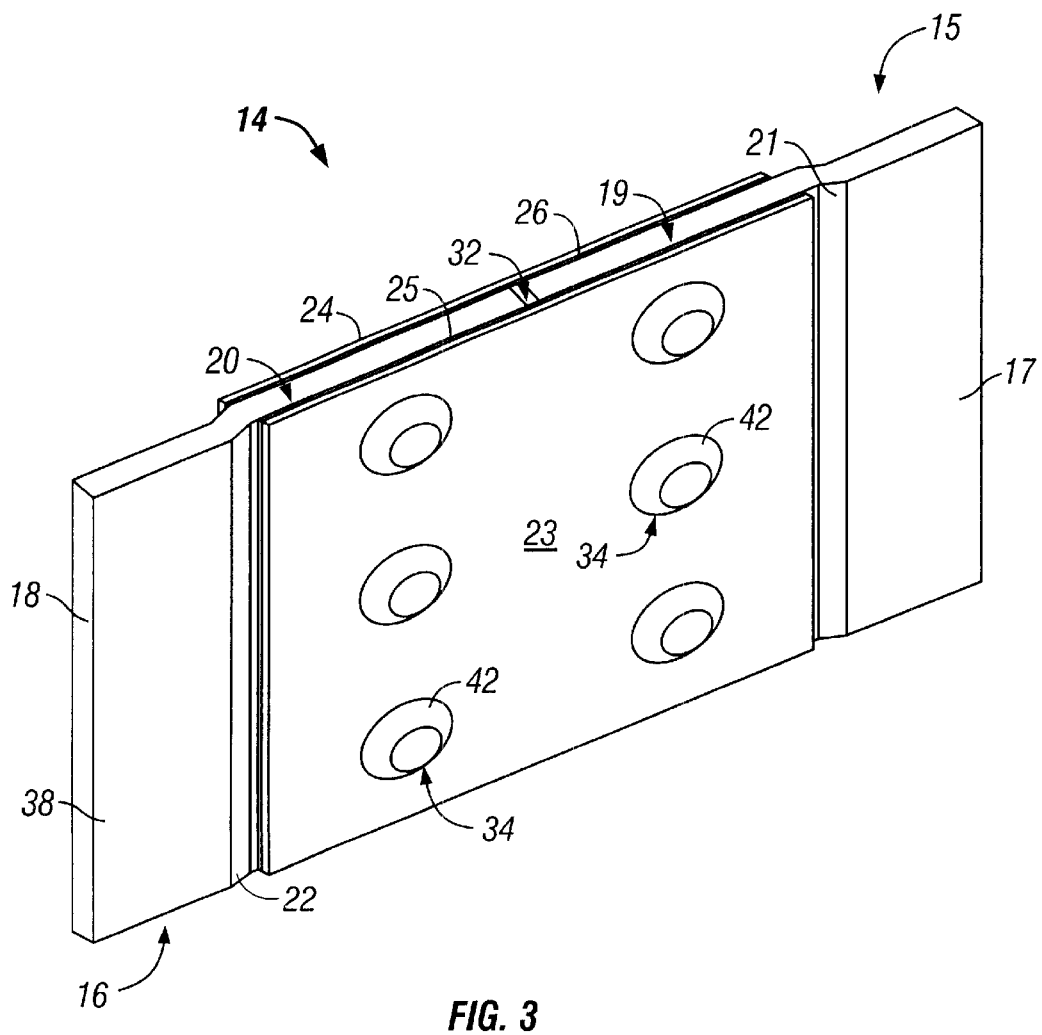
FIG. 3 is a perspective view of the joint of FIG. 2 showing the various elements of FIG. 2 riveted together.

Referring now to FIGS. 2 and 3, joint 14 is illustrative of a joint according to one highly preferred embodiment of the present invention as it would appear from the interior of a trailer. The interior space of the trailer would generally be in the foreground of FIGS. 2 and 3 and the space outside the trailer would generally be in the background of FIGS. 2 and 3. The illustrated embodiment of joint 14, then, is generally comprised of a fore sidewall panel 15, an aft sidewall panel 16, an interior adhesive sheet 25, an exterior adhesive sheet 26, an interior splicer plate 23, and an exterior splicer plate 24. As further described below, interior and exterior adhesive sheets 25, 26 are preferably applied to interior and exterior splicer plates 23, 24 and then sandwiched around abutting fore and aft sidewall panels 15, 16, thereby coupling them together. Rivets 34 (shown in FIG. 3) are then inserted through the layered elements for additional strength.

Referring specifically to FIG. 2, fore sidewall panel 15 includes a main plateau 17, a spliced plateau 19, and a jogged portion 21 serving as a transition between main plateau 17 and spliced plateau 19. Similarly, aft sidewall panel 16 includes a main plateau 18, a spliced plateau 20, and a jogged portion 22 serving as a transition between main plateau 18 and spliced plateau 20. Both fore and aft sidewall panels 15, 16 are configured such that main plateaus 17, 18 lie in planes separate from, and parallel to, their corresponding spliced plateaus 19, 20. Jogged portions 21, 22, then, serve as the transitions between main plateaus 17, 18 at one level and spliced plateaus 19, 20 at another level. As seen in FIGS. 2 and 3, it is apparent that jogged portions 21, 22 "move" or offset fore and aft sidewall panels 15, 16 from one plane at main plateaus 17, 18 to another plane at spliced plateaus 19, 20 without varying the thickness of panels 15, 16. Put another way, the thickness of panels 15, 16 remains consistent throughout.

It will be readily understood by one of ordinary skill in the art that FIGS. 2 and 3 illustrate only small portions of sidewall panels 15, 16. In reality, main plateaus 17, 18 extend well beyond the boundary of either FIG. 2 or FIG. 3 and preferably make up the majority of panels 15, 16, and, therefore, of an interior wall surface 38 of the trailer. FIGS. 2 and 3 merely illustrate those portions of sidewall panels 15, 16 necessary to illustrate the detail of joint 14. As can be seen in FIG. 1, in reality, the various sidewall panels preferably extend laterally a distance several times the width of joint 14.

Consecutive fore and aft sidewall panels 15, 16 are situated beside each other at a seam 32 with spliced plateaus 19, 20 lying in one plane and main plateaus 17, 18 lying in another. Sidewall panels 15, 16 may be butted tightly against each other, or may be separated. Preferably, a small gap is left between panels 15, 16 so that panels 15, 16 are basically butted against each other, but do not need to be manufactured with a particularly high degree of precision. In any event, spliced plateaus 19, 20 cooperate to form a corrugated or recessed region 35 at the intersection of consecutive fore and aft sidewall panels 15, 16. Recessed region 35 provides a degree of stiffness to joint 14 and a brief indentation, interrupting the otherwise smooth interior trailer wall surface 38 created by main plateaus 17, 18. Recessed region 35 serves to couch interior splicer plate 23, interior adhesive sheet 25, and rivet heads 42 (shown in FIG. 3) as they cooperate with exterior splicer plate 24 and exterior adhesive sheet 26 to couple sidewall panels 15, 16 together, as further discussed below.

In accordance with one highly preferred embodiment, with sidewall panels 15, 16 butted against each other at seam 32, adhesive sheets 25, 26 are preferably applied to interior surfaces 45, 46 of splicer plates 23, 24. Then, interior and exterior splicer plates 23, 24, with interior and exterior adhesive sheets 25, 26 thus applied, are adhered over seam 32 to sidewall panels 15, 16. However, it will be readily understood by one of ordinary skill in the art that adhesive sheets 25, 26 (or any other suitable adhesive such as glue which is applied by spreading, double-sided tape, compounds, and the like) can be first applied over seam 32 to sidewall panels 15, 16 and, then, splicer plates 23, 24 adhered thereto. In either way, splicer plates 23, 24, in combination with adhesive sheets 25, 26, serve to couple fore sidewall panel 15 to adjoining aft sidewall panel 16. Splicer plates 23, 24 are preferably galvanized steel, but any rigid plate material, including various metals, plastics, woods, composites, and the like, is suitable. Adhesive sheets 25, 26 are preferably a very high bond tape, but can include any number of suitable adhesives or cohesives, including glues, double-sided tapes, compounds, and the like. Additionally, it will be readily apparent to one of ordinary skill in the art that, if desired, joint 14 may be configured without any adhesive (adhesive sheets 25, 26, or otherwise). In this case, one or more splicer plates alone or in combination serve to couple sidewall panels 15, 16.

With continued reference to FIG. 2, interior splicer plate 23, with interior adhesive sheet 25 attached thereto, is couched in recessed region 35 to limit the extent to which it protrudes beyond interior trailer wall surface 38 defined by main plateaus 17, 18. Protrusions beyond interior trailer wall surface 38, and into the interior region of the trailer, are thus lessened or altogether eliminated.

Referring to FIG. 3, after splicer plates 23, 24, with adhesive sheets 25, 26 adhered thereto, are sandwiched around seam 32, rows of rivets 34 are preferably inserted on both sides of seam 32 to further reinforce and strengthen joint 14. Rivets 34 preferably extend entirely through splicer plates 23, 24, adhesive sheets 25, 26, and sidewall panels 15, 16. Rivets 34 are preferably inserted through these layers only after the layers have been sandwiched together. In this way, adhesive layers 25, 26 preferably seal the entire joint 14, including the holes created by the insertion of rivets 34. The use of adhesive sheets 25, 26 aids in the insertion of rivets 34 through the multiple layer joint 14 without pre-drilling rivet holes in the individual layers. Without adhesive sheets 25, 26, it may be difficult to insert rivets 34 through the sandwiched layers of joint 14 without pre-drilling because panels 15, 16 and splicer plates 23, 24 may tend to shift as rivets 34 are being punched through the layers. Of course, if desired, it is still possible to partially or fully pre-form rivet holes through the sandwiched layers of joint 14 in any conventional manner prior to riveting the layers together. Adhesive sheets 25, 26 also help prevent "puckering" of splicer plates 23, 24 as multiple layer joint 14 is being riveted together. To that end, adhesive sheets 25, 26 also allow for fewer rivets along seam 32 than would otherwise be required if no adhesive were used.

As shown in FIG. 3, rivet heads 42 are preferably also partially or completely couched in recessed region 35 along with interior splicer plate 23 and interior adhesive sheet 25. Again, recessing rivet heads 42 serves to lessen or eliminate protrusions beyond interior trailer surface 38.

The preferred embodiment described above includes interior splicer plate 23, exterior splicer plate 24, interior adhesive sheet 25, and exterior adhesive sheet 26. However, it will be readily apparent to one of ordinary skill in the art that alternative embodiments of the present invention may instead eliminate one or both adhesive sheets and/or one or both splicer plates to achieve a coupling at joint 14 in accordance with the present invention. Additionally, alternative embodiments may employ any number of conventional devices (e.g. belts, biscuits, bolts, brackets, bridges, chains, clamps, clasps, clips, dowels, latches, pegs, pins, posts, screws, etc.) other than splicer plates and rivets to attach fore and aft sidewall panels 15, 16, while still utilizing recessed region 35 to reduce or eliminate protrusions into the trailer interior. Spliced plateaus 19, 20 created by bending or jogging sidewall panels 15, 16 at jogged portions 21, 22, cooperate to form recessed region 35. Recessed region 35 may couch any of a number of equivalent devices (including those listed above) for coupling panels 15, 16, still falling within the spirit and scope of this disclosure, including the accompanying claims.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

I claim:

1. A wall joint comprising:
   a first panel having a main plateau defining a first plane, a spliced plateau defining a second plane substantially parallel to and spaced-apart from the first plane, and a jogged portion interconnecting the main plateau and the spliced plateau, the spliced plateau and main plateau being substantially the same thickness;
   a second panel having a main plateau lying generally in the first plane, a spliced plateau lying generally in the second plane, and a jogged portion interconnecting the main plateau and the spliced plateau, the spliced plateau and main plateau being substantially the same thickness; and
   a splicer coupled to the spliced plateaus of both the first and second panels.

2. The joint of claim 1, wherein the spliced plateaus each have first and second opposing surfaces and the splicer comprises first and second splicer plates, the first splicer plate coupling the first surfaces of the spliced plateaus together and the second splicer plate coupling the second surfaces of the spliced plateaus together.

3. The joint of claim 2, wherein the splicer further comprises first and second adhesive sheets, the first adhesive sheet positioned to lie between the first splicer plate and the first surfaces of the spliced plateaus and the second adhesive sheet positioned to lie between the second splicer plate and the second surfaces of the spliced plateaus.

4. The joint of claim 3, further comprising a plurality of rivets inserted through the splicer plates and the spliced plateaus.

5. The joint of claim 1, wherein the splicer comprises a single plate of rigid material.

6. The joint of claim 5, wherein the splicer further comprises an adhesive positioned to lie between the plate of rigid material and the spliced plateaus.

7. The joint of claim 6, further comprising a plurality of rivets inserted through the plate of rigid material and the spliced plateaus.

8. The joint of claim 1, wherein the first and second panels are composite panels having a first core material sandwiched between layers of a second material, different from the first core material.

9. The joint of claim 1, wherein the first and second panels are aluminum.

10. A wall joint comprising:
    a first sidewall panel located substantially in a first plane;
    a second sidewall panel located substantially in the first plane;
    a splicer plate coupled to the first and second panels and lying in a second plane which is generally parallel to the first plane; and an adhesive sheet between the first sidewall panel and the splicer plate, and between the second sidewall panel and the splicer plate, each of the first and second sidewall panels having a plateau portion lying in a third plane and to which the splicer plate is coupled.

11. The joint of claim 10, wherein the plateau portions include inwardly facing surfaces and outwardly facing surfaces and the splicer plate is coupled to the inwardly facing surfaces of the plateau portions, a second splicer plate is coupled to the outwardly facing surfaces of the plateau portions, and a second adhesive sheet is positioned to lie between the outwardly facing surfaces and the second splicer plate.

12. The joint of claim 11, further comprising a plurality of rivets inserted through the splicer plate and the plateau portions.

13. The joint of claim 10, wherein the first and second sidewall panels are composite panels having a first core material sandwiched between layers of a second material, different from the first core material.

14. The joint of claim 10, wherein the first and second sidewall panels are aluminum.

15. A cargo body, comprising:
a plurality of panels arranged in side-by-side relationship to define pairs of adjacent first and second panels;
a joint between each pair of adjacent first and second panels, each joint being at least partially defined by an edge of the first panel and an edge of the second panel adjacent to the first panel,
the first panel having a main plateau defining a first plane, a spliced plateau defining a second plane substantially parallel to and spaced apart from the first plane, and a jogged portion interconnecting the main plateau and the spliced plateau, the spliced plateau and main plateau being substantially the same thickness;
the second panel having a main plateau lying generally in the first plane, a spliced plateau lying generally in the second plane, and a jogged portion interconnecting the main plateau and the spliced plateau, the spliced plateau and main plateau being substantially the same thickness; and
a splicer coupled to the spliced plateaus of each pair of adjacent first and second panels.

16. The cargo body of claim 15, wherein the spliced plateaus of each pair of adjacent first and second panels have first and second opposing surfaces and each splicer comprises first and second splicer plates, the first splicer plate coupling the first surfaces of the spliced plateaus together and the second splicer plate coupling the second surfaces of the spliced plateaus together.

17. The cargo body of claim 16, wherein each splicer further comprises first and second adhesive sheets, the first adhesive sheet is positioned to lie between the first splicer plate and the first surfaces of the spliced plateaus and the second adhesive sheet is positioned to lie between the second splicer plate and the second surfaces of the spliced plateaus.

18. The cargo body of claim 17, further comprising a plurality of rivets inserted through each splicer plate and the spliced plateaus.

19. The cargo body of claim 15, wherein the splicer comprises a single plate of rigid material.

20. The cargo body of claim 19, wherein the splicer further comprises an adhesive positioned to lie between the plate of rigid material and the spliced plateaus.

21. The cargo body of claim 20, further comprising a plurality of rivets inserted through the plate of rigid material and the spliced plateaus.

22. The cargo body of claim 15, wherein the panels are composite panels each having a first core material sandwiched between layers of a second material different from the first core material.

23. The cargo body of claim 15, wherein the panels are aluminum.

24. A cargo body, comprising:
a plurality of sidewall panels defining pairs of adjacent first and second sidewall panels;
the first sidewall panel in each pair of adjacent sidewall panels located substantially in a first plane;
the second sidewall panel in each pair of adjacent sidewall panels located substantially in the first plane;
a splicer plate coupled to each pair of first and second sidewall panels and lying in a second plane which is generally parallel to the first plane; and
an adhesive sheet between each first sidewall panel and splicer plate coupled thereto, and between each second sidewall panel and splicer plate coupled thereto,
each of the first and second sidewall panels having a plateau portion lying in a third plane and to which the splicer plate is coupled.

25. The cargo body of claim 24, wherein the plateau portions include inwardly facing surfaces and outwardly facing surfaces and the splicer plate is coupled to the inwardly facing surfaces of the plateau portions, a second splicer plate is coupled to the outwardly facing surfaces of the plateau portions, and a second adhesive sheet is positioned to lie between the outwardly facing surfaces and the second splicer plate.

26. The cargo body of claim 25, further comprising a plurality of rivets inserted through the splicer plates and the plateau portions.

27. The cargo body of claim 24, wherein the sidewall panels are composite panels each having a first core material sandwiched between layers of a second material different from the first core material.

28. The cargo body of claim 24, wherein the sidewall panels are aluminum.

29. The wall joint of claim 10, wherein the third plane is co-planar with the second plane.

30. The cargo body of claim 24, wherein the third plane is co-planar with the second plane.

* * * * *